H. C. HILLS.
Pruning Shears.
No. 141,273. Patented July 29, 1873.
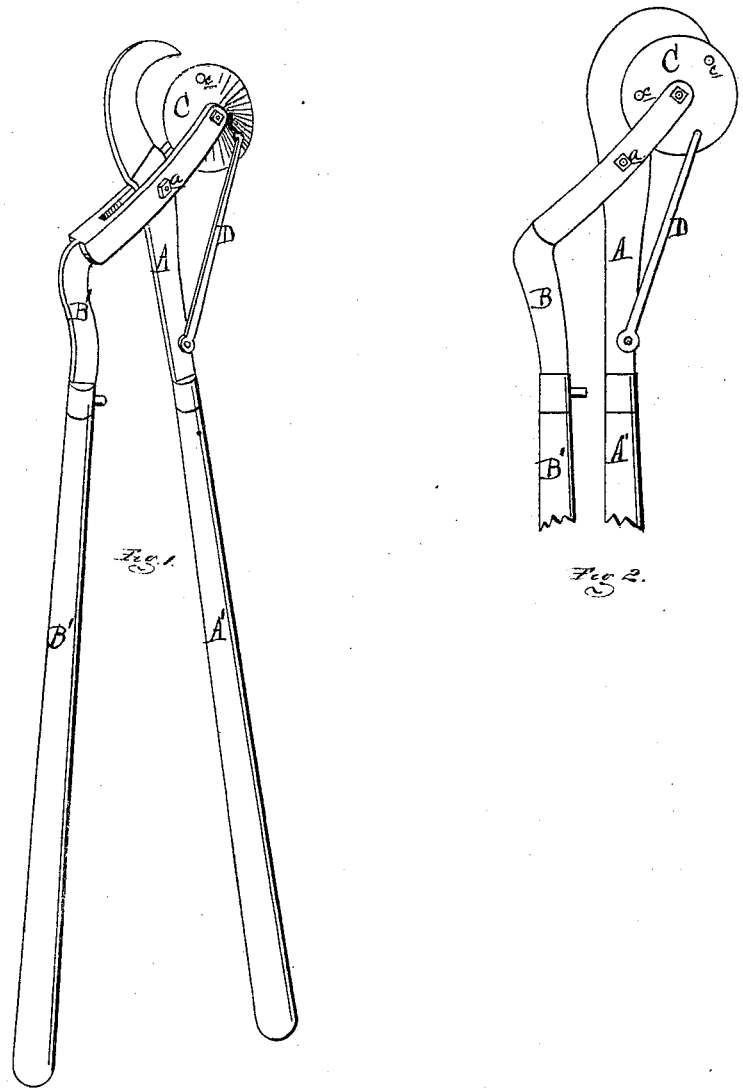

UNITED STATES PATENT OFFICE.

HENRY C. HILLS, OF PINCKNEY, MICHIGAN, ASSIGNOR TO HIMSELF AND WILLIAM DOLAN, OF SAME PLACE, AND GEORGE MILLS, OF HIGHLAND, MICHIGAN.

IMPROVEMENT IN PRUNING-SHEARS.

Specification forming part of Letters Patent No. 141,273, dated July 29, 1873; application filed March 17, 1873.

*To all whom it may concern:*

Be it known that I, HENRY C. HILLS, of Pinckney, in the county of Livingston and State of Michigan, have invented a new and useful Improvement in Pruning-Shears; and I do declare that the following is a true and accurate description thereof, reference being had to the accompanying drawings and to the letters of reference marked thereon, and being a part of this specification, in which—

Figure 1 is a perspective view of the shears in operation, and Fig. 2 is an elevation of the same closed.

Like letters refer to like parts in both figures.

The nature of this invention relates to an improvement in pruning-shears; and has for its object to enable the operator to sever limbs and twigs with a clean smooth drawing cut, and with less exertion than is required in the operation of the various forms of shears heretofore used for a like purpose. The invention consists in a novel arrangement of a rotary cutter, as more fully hereinafter set forth.

In the drawing, A represents the stationary lever, provided with a hook on its outer end to reach over and grasp the branch or twig to be severed, and with a handle, A', at the other end. B is the moving lever, provided with a handle, B'. It is forked at its outer end, which fork is diagonally bent with relation to the handle. The fork embraces the shank of the lever A, to which it is pivoted by a bolt, $a$, passing through both. C is a disk-cutter, pivoted, by a bolt, $b$, between the outer ends of the fork, and is provided with several openings, $c$, in one of which is inserted a hook at the end of a radius-rod, D, whose other end is pivoted to the shank of the lever A, near its insertion in the handle, the object of which is to cause the cutter to roll on its axis when moved toward the hook by the handle B' being brought toward the handle A', which compels it to sever the wood between it and the hook with a rolling and drawing cut. Without the rod D the device would shear the wood; but without the drawing cut, which makes the operation so much easier, by engaging the rod D with the holes in the disk successively, the operator can always present a sharp surface to the wood, while the cutter is uniformly worn around its circumference.

What I claim as my invention, and desire to secure by Letters Patent, is—

The combination of the rotary cutter C upon the lever B with the arm D, the latter being adapted to adjust the cutter so as to utilize all its surface for cutting, as described.

HENRY C. HILLS.

Witnesses:
H. F. EBERTS,
H. S. SPRAGUE.